United States Patent
Yamasaki et al.

(10) Patent No.: US 7,509,139 B2
(45) Date of Patent: Mar. 24, 2009

(54) METHOD FOR SELECTING BASE STATION

(75) Inventors: Ryota Yamasaki, Kokubunji (JP); Kumiko Takikawa, Tama (JP); Atsushi Ogino, Kodaira (JP); Takaki Uta, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 612 days.

(21) Appl. No.: 11/329,153

(22) Filed: Jan. 11, 2006

(65) Prior Publication Data

US 2006/0234756 A1  Oct. 19, 2006

(30) Foreign Application Priority Data

Apr. 13, 2005  (JP) .............................. 2005-115238

(51) Int. Cl.
 *H04Q 7/20* (2006.01)
 *H04Q 7/32* (2006.01)
(52) U.S. Cl. .................. 455/525; 455/524; 455/517; 455/550.1; 455/434; 455/432.1; 370/310; 370/310.2; 370/328
(58) Field of Classification Search ................ 455/525, 455/524, 517, 512, 500.69, 522, 513, 515, 455/422.1, 403, 412.1, 412.2, 418–420, 432.1, 455/434, 436–444, 445, 550.1, 426.1, 426.2; 370/310, 310.2, 328, 331, 332, 338
See application file for complete search history.

(56) References Cited

U.S. PATENT DOCUMENTS

| | | | | |
|---|---|---|---|---|
| 6,505,043 | B1 * | 1/2003 | Aihara | 455/436 |
| 7,324,827 | B2 * | 1/2008 | Pedraza et al. | 455/522 |
| 7,383,054 | B2 * | 6/2008 | Chou et al. | 455/512 |

FOREIGN PATENT DOCUMENTS

JP  2004-101254  4/2004

* cited by examiner

Primary Examiner—Keith T Ferguson
(74) Attorney, Agent, or Firm—Antonelli, Terry, Stout & Kraus, LLP.

(57) ABSTRACT

When one base station to which a terminal is to connect is determined from a plurality of base stations in a wireless communication system, the best base station is selected according to the communication quality or the content of communication services. In the wireless communication system, the plurality of base stations are classified into a plurality of groups. Indexes of communication quality between the base stations and the terminal are obtained and, for each group, the characterizing quantities of the indexes of communication quality are calculated. The base station group with which the terminal is to communicate is specified based on the characterizing quantities. One of the base stations in the specified group is determined as a communication destination base station.

16 Claims, 15 Drawing Sheets

FIG.3A

GROUP IDENTIFICATION TABLE 301

| GROUP ID | GROUP SCORE | BASE STATION ID | RECEIVED POWER |
|---|---|---|---|
| G1 | S1 | 201 | R1 |
|  |  | 202 | R2 |
| G2 | S2 | 203 | R3 |
|  |  | 204 | R4 |
| G3 | S3 | 205 | R5 |
|  |  | 206 | R6 |

FIG.3B

EXAMPLE OF GROUP SCORE CALCULATION 302

CASE WHERE SUM TOTAL OF RECEIVED POWER = GROUP SCORE $S1 = R1 + R2$ $S2 = R3 + R4$ $S3 = R5 + R6$

CASE WHERE AVERAGE OF RECEIVED POWER = GROUP SCORE $$S1 = \frac{R1 + R2}{2}$$

$$S2 = \frac{R3 + R4}{2}$$

$$S3 = \frac{R5 + R6}{2}$$

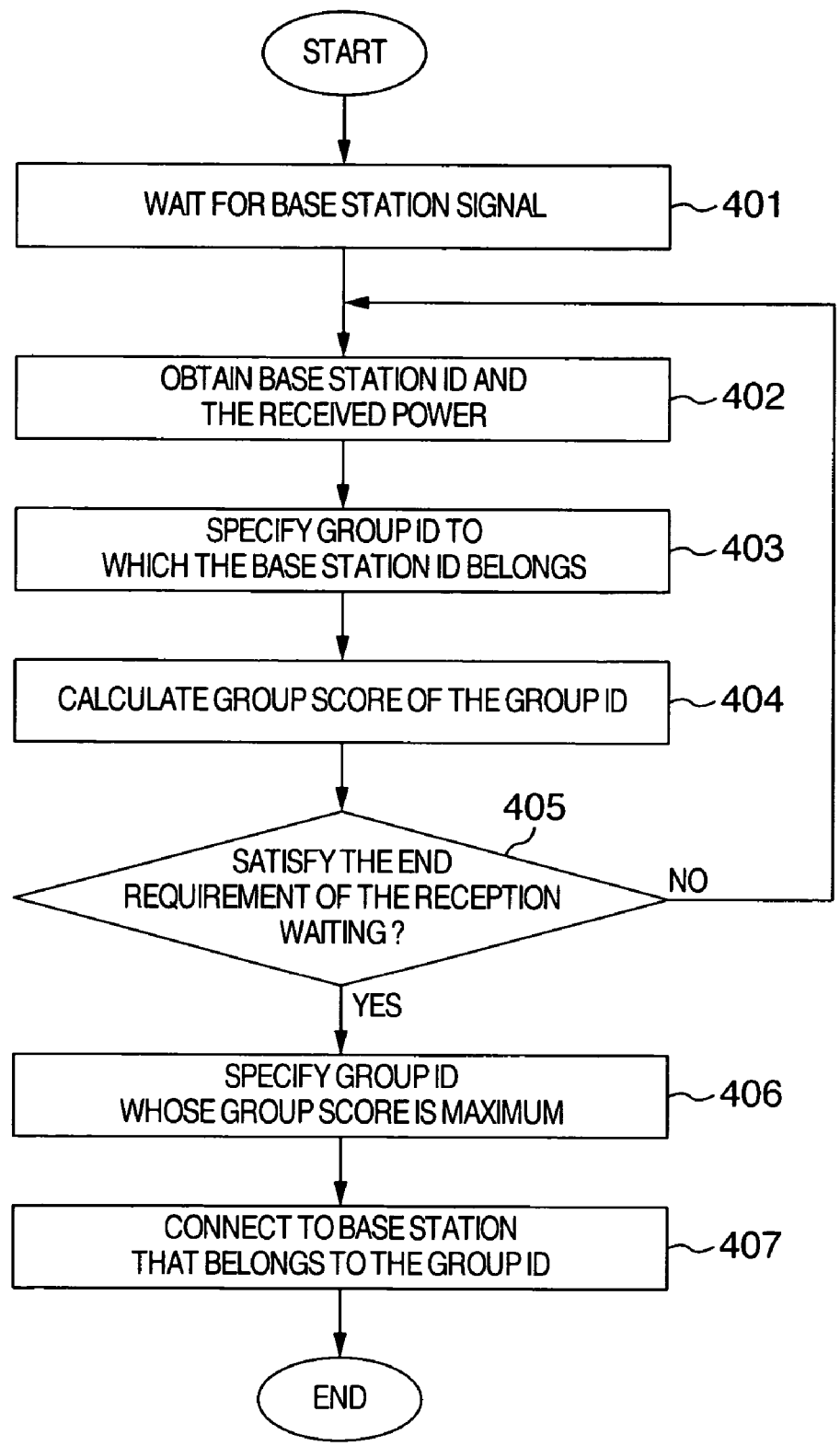

| GROUP IDENTIFICATION TABLE | | | 801 |
|---|---|---|---|
| GROUP ID | GROUP SCORE | BASE STATION ID | RECEIVED POWER |
| G1 | S1 | 701 | R1 |
| | | 702 | R2 |
| G2 | S2 | 703 | R3 |
| | | 704 | R4 |
| G3 | S3 | 705 | R5 |
| | | 706 | R6 |

FIG.14

GROUP IDENTIFICATION TABLE 1400

| GROUP ID | GROUP SCORE | BASE STATION ID | RECEIVED POWER |
|---|---|---|---|
| G1 | S1 | 1301 | R1 |
| | | 1302 | R2 |
| | | 1303 | R3 |
| G2 | S2 | 1304 | R4 |
| | | 1305 | R5 |
| | | 1306 | R6 |

FIG.17

GROUP IDENTIFICATION TABLE                                    1700

| GROUP ID | GROUP SCORE | BASE STATION ID | RECEIVED POWER |
|----------|-------------|-----------------|----------------|
| 1F       | S1          | 1601            | R1             |
|          |             | 1602            | R2             |
|          |             | 1603            | R3             |
|          |             | 1604            | R4             |
| 2F       | S2          | 1605            | R5             |
|          |             | 1606            | R6             |
|          |             | 1607            | R7             |
|          |             | 1608            | R8             |
| 3F       | S3          | 1609            | R9             |
|          |             | 1610            | R10            |
|          |             | 1611            | R11            |
|          |             | 1612            | R12            |

METHOD FOR SELECTING BASE STATION

INCORPORATION BY REFERENCE

The present application claims priority from Japanese application JP2005-115238 filed on Apr. 13, 2005, the content of which is hereby incorporated by reference into this application.

BACKGROUND OF THE INVENTION

1. Field of the Invention

The present invention relates to a method for selecting one wireless base station, with which a terminal is to communicate, from multiple base stations in a wireless system.

2. Description of the Related Art

Recently, wireless communication systems are becoming an infrastructure essential for the society. Wireless communication systems are classified roughly into two: one is a public network such as mobile phones and PHS where corporations provide facilities such as base stations and the other is a private network such as a wireless LAN, Bluetooth (registered trademark), and Zigbee (registered trademark)) where users prepare facilities such as base stations. Wireless communication devices for a private network, which are easy to install and low in cost, are being widely installed to allow users to communicate wirelessly wherever they are.

Wireless communication standards such as a wireless LAN and Bluetooth (registered trademark) were created with focus on data communication via personal computers and information communication terminals. Recently, however, there is a rapidly increasing need for various types of service other than data communication with the result that the wireless communication standard in a private network sometimes does not satisfy the communication quality required for those services. One typical example is the IP phone service. An IP phone is a service in which voice data is sent to the packet communication network, instead of the conventional switched telephone network, to implement the function equivalent to that available in the conventional telephone network. Wireless LAN standards such as IEEE802.11b are used to implement the IP phone function using a wireless terminal. Those standards, originally designed for data communication, involve problems such as a tendency to interrupt communication. A problem is generated also in handoff carried out for changing the connection destination from the current base station to another. In a wireless LAN, a terminal that connects to a base station before starting the communication selects a destination base station, for example, by selecting a base station from which a beacon (broadcast base signal) with the largest received power is received. Handoff is carried out in such a way that, if the received power of the signal received from the base station currently in communication falls below a predetermined threshold, the base station is changed to the next connection destination (finding a beacon with larger received power). At this time, if a low power state exists for a long time before the terminal is successfully connected to the next base station, the communication quality deteriorates. In addition, to solve the problem that the call is interrupted after the communication is once broken and before the next connection destination is found, a technology is developed for non-interrupted handoff. A service for wirelessly delivering a moving image in streaming mode also involves a problem that the moving image tends to be interrupted.

There is also a wireless-LAN-based position detection service disclosed in JP-A-2004-101254 (Patent Document 1). In this service, a wireless terminal must connect to a base station called a master base station. Although the master base station is installed in a good electric wave environment to ensure good position detection accuracy, the position detection accuracy is decreased if the terminal connects to a base station other than the master base station. Another problem is that, when hand off occurs, the terminal cannot connect to the next master base station.

As described above, a wireless communication method used in a private network has a problem that the method cannot satisfy the communication quality required for the wireless communication services that are diversified recently. Especially, though the installation positions of base stations are determined in a public network by calculating the electric wave range, such a calculation is not usually carried out in a private network. Instead, the installation positions of base stations in a private network are determined in many cases based on the ease of connection to a wired communication network or on the arrangement of furniture and fixtures. Therefore, a simple method, in which a wireless terminal connects to a base station from which the maximum received power is received, does not sometimes satisfy the quality required by services. For example, assume that, in a building where wireless base stations are arranged randomly, a wireless terminal has been connected to a base station on another floor from which a strong signal was received at a particular time. In this case, if the wireless terminal is moved even for a short distance, the quality of communication with that base station deteriorates greatly and communication with the base station is sometimes broken. To prevent such a problem from occurring, it is necessary to select a base station, with which a wireless terminal connects, according to the services that are used or according to the communication quality that is required.

SUMMARY OF THE INVENTION

The present invention solves the problem by using a connection control method for selecting one base station, with which a terminal is to wirelessly communicate, from a plurality of base stations in a wireless communication system. The plurality of base stations are classified into a plurality of groups each having a unique identifier. The connection control method obtains an index of communication quality between a wireless terminal and wireless base stations for each of the plurality of base stations, calculates characterizing quantities of the communication quality for each of the groups based on the identifier, specifies one of the plurality of groups based on the charactering quantities, and selects one of base stations, which belong to the specified group, as a connection destination base station of the wireless terminal.

For example, a received power is used as the index of communication quality. Multiple received powers are added up for each group to calculate the total power. Assuming that a group whose total power is the largest is a group that provides the best service, the terminal is connected to a base station in the group whose total power is the largest. Information on a bit rate at which data is sent or information on the SNR, if available, may also be used as the index of communication quality.

A characterizing quantity may also be an average that is obtained by dividing the total power of each group by the number of base stations in the group. This method generates characterizing quantities that do not depend on the number of base stations.

A base station in a group to be used as the connection destination base station may also be determined in the group in advance. A base station whose received power is the largest in a group may also be selected as the connection destination base station. If the bit rate can be obtained, a base station capable of communicating at the highest bit rate may also be selected. If the SNR can be obtained, a base station whose SNR is the highest may also be selected.

The method according to the present invention allows a wireless terminal to select a right communication destination base station according to the wireless communication service that is used or the communication quality that is required. The selection of a right base station gives the user high-quality wireless communication services.

Especially, the method according to the present invention reduces the number of times the base station is switched in the IP telephony services and therefore provides better telephony quality. The method also reduces the number of times the base station is switched in the moving-image streaming delivery services and therefore delivers moving-images without interruption. In addition, in a wireless LAN position detection system, the method allows a wireless terminal to connect to a base station on the same floor as the wireless terminal and therefore provides high-precision position detection.

Other objects, features and advantages of the invention will become apparent from the following description of the embodiments of the invention taken in conjunction with the accompanying drawings.

BRIEF DESCRIPTION OF THE DRAWINGS

FIG. 3A is a diagram showing an example of group identification table information entered into a terminal.

FIG. 3B is a diagram showing an example of group score calculation in the embodiment in which the terminal side performs base station selection processing.

FIG. 3C is a diagram showing a calculation example in the embodiment in which the terminal side performs base station selection processing.

FIG. 4 is a terminal processing flowchart in the embodiment in which the terminal side performs base station selection processing.

FIG. 14 is a diagram shows the group identification table information used in the embodiment in which the present invention is applied to an IP phone system.

FIG. 17 is a diagram showing the group identification table information used in the embodiment in which the present invention is applied to the wireless-LAN-based position detection system.

DETAILED DESCRIPTION OF THE EMBODIMENTS

Embodiment of the present invention will be described with reference to the drawings.

Figure 2:
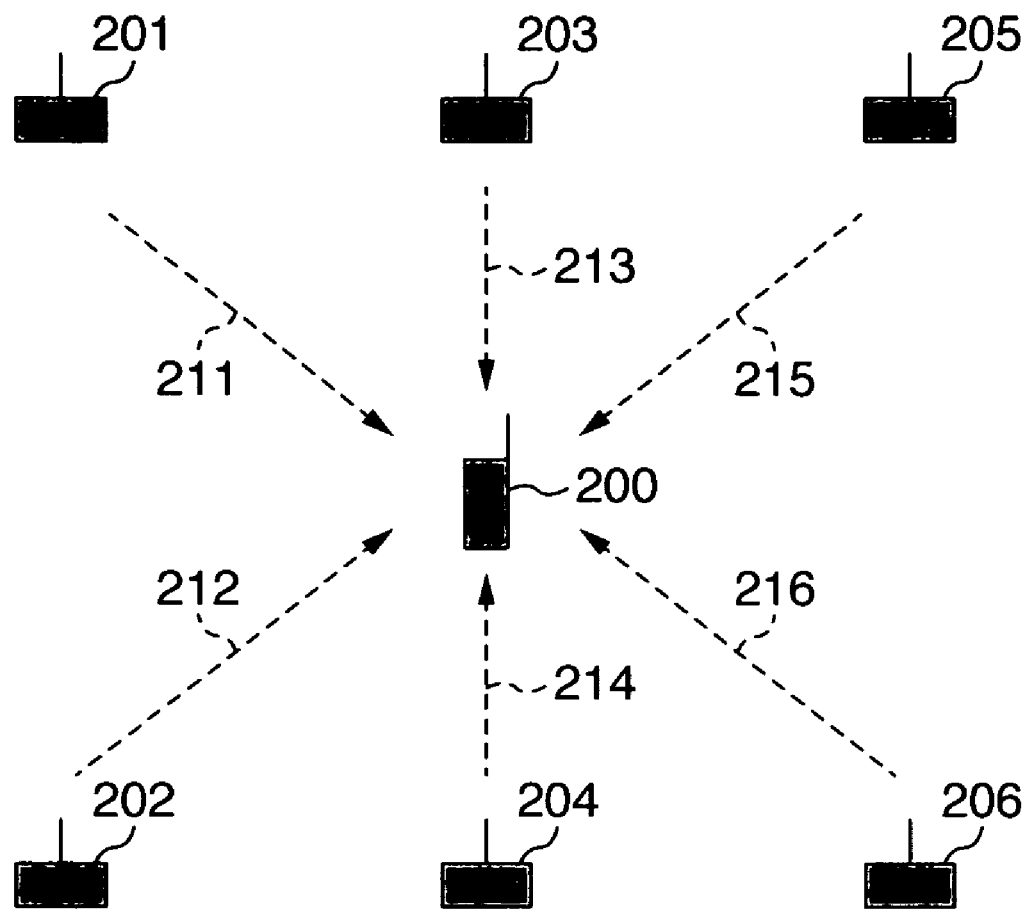
FIG. 2 is a diagram showing the general view of an embodiment in which the terminal side performs base station selection processing.

FIG. 2 is a diagram showing the whole system in which the wireless terminal side selects a base station. Multiple base stations 201, 202, 203, 204, 205, and 206 are installed, each sending a wireless signal (beacon) 211, 212, 213, 214, 215, and 216, respectively. Each of the wireless signals 211-216 includes a base station ID identifying the base station that sends the wireless signal. The following describes a procedure used by the wireless terminal 200 for receiving those wireless signals and determining a base station to which it connects.

FIG. 3 shows a group identification table 301 for use by a terminal for classifying the base stations 201-206 into groups for identification. The table 301 must be entered into the terminal in advance before selecting a base station according to the method of the present invention. The table 301 includes four types of information: group ID, group score, base station ID, and received power. The terminal references the table 301 to determine that the base stations 201 and 202 belong to group G1, the base stations 203 and 204 belong to group G2, and the base stations 205 and 206 belong to group G3.

Figure 1:
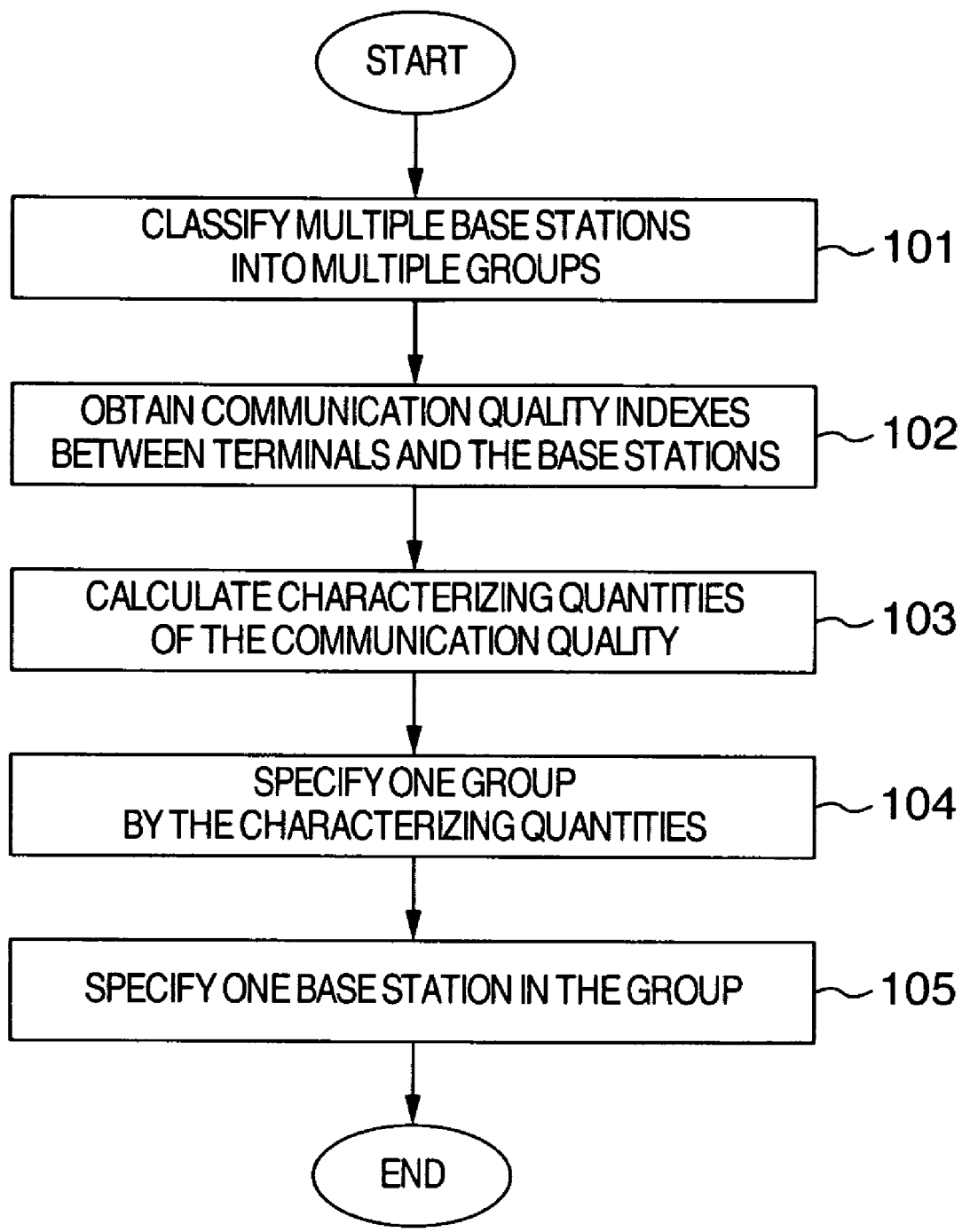
FIG. 1 is a flowchart showing the basic processing of an embodiment of the present invention.

With reference to FIG. 1, the following describes how a terminal determines a connection destination base station. In step 101, the terminal uses the group identification table 301 to identify the base stations and their groups. In step 102, the terminal receives the beacon signal from the base stations and measures the received power. Next, in step 103, the terminal calculates the average value of the multiple measured received powers for each group using the identification table 301. In step 104, the terminal determines the group, which has the largest average value calculated in step 103, as the connection destination group. In step S105, the terminal determines one of base stations of the group, which is determined in step 104, as the connection destination base station.

Upon receiving the wireless signals 211-216, the terminal obtains the charactering quantities, for example, received powers, and records them in the table as received powers R1-R6. After that, the terminal uses the received powers R1-R6 to calculate group scores S1, S2, and S3 for the groups. In the group score calculation example 302 as shown in FIG. 3B, the sum of received powers is used as the group score. That is, the group score S1 of group G1 is calculated as the sum of R1 and R2. The score S2 of group G2 and the score S3 of group G3 are calculated in the same way. In the calculation example 303 as shown in FIG. 3C, the average received power per base station is calculated for each group and the resulting average received power is used as the group score. That is, the score S1 of group G1 is calculated by dividing the sum of R1 and R2 by the number of base stations in the group (2 in this example). This calculation example 303 is an effective calculation method when the number of base stations differs among groups. A value other than a received power, if available for use as a communication quality index, may also be used. For example, if information on the bit rate at which a base station can communicate can be obtained, the bit rate may be used as the group score.

FIG. 4 is a flowchart showing the processing flow when the terminal determines a connection destination base station. In step 401, the terminal starts waiting for a base station to send the wireless signal. In response to the signal, the terminal obtains the base station ID and the received power from the signal in step 402. Next, in step 403, the terminal determines the group ID from the base station ID. Next, in step 404, the terminal uses the received power to calculate the group score of the corresponding group ID. After calculating the group score, the terminal checks in step 405 if the end requirement of reception waiting is satisfied. If the end requirement is not yet satisfied, control is returned to step 402 and the terminal waits for another base station to send the signal. If the end requirement is satisfied, the terminal specifies the group ID whose group score is the maximum in step 406. Next, in step 407, the terminal selects one of base stations from those belonging to the group with the specified group ID and determines the selected base station as the connection destination base station of the terminal. By executing the processing flow described above, the terminal can select the base station, best suited for the wireless communication service, as the connection destination. For example, for the IP phone communication service, the terminal can select a base station with which the terminal can maintain good communication quality even if the terminal moves a short distance. For the moving image streaming delivery service, a high-quality moving image can be delivered while maintaining a high bit rate.

When the terminal selects a reconnection destination base station during handoff, the terminal can also execute a processing flow similar to that in FIG. 1 or FIG. 4 to always maintain good communication quality.

One of several types of end requirement may be used in step 405. For example, the reception waiting time is predetermined and, if the predetermined waiting time has elapsed, the end requirement of reception waiting is satisfied. Alternatively, the reception waiting state can be continued until the signal is received from all base stations. In addition, when a group ID whose group score is the maximum is determined in processing step 406, the maximum score value is not necessarily used. Instead, the minimum score value or a value equal to or larger, or equal or smaller, than a threshold may also be selected depending upon the situation. In step 407, one of base stations can be selected from those in the group, for example, by selecting a base station with the maximum received power or by selecting a connection destination base station predetermined in the group and connecting the terminal to the predetermined base station.

Figure 5:
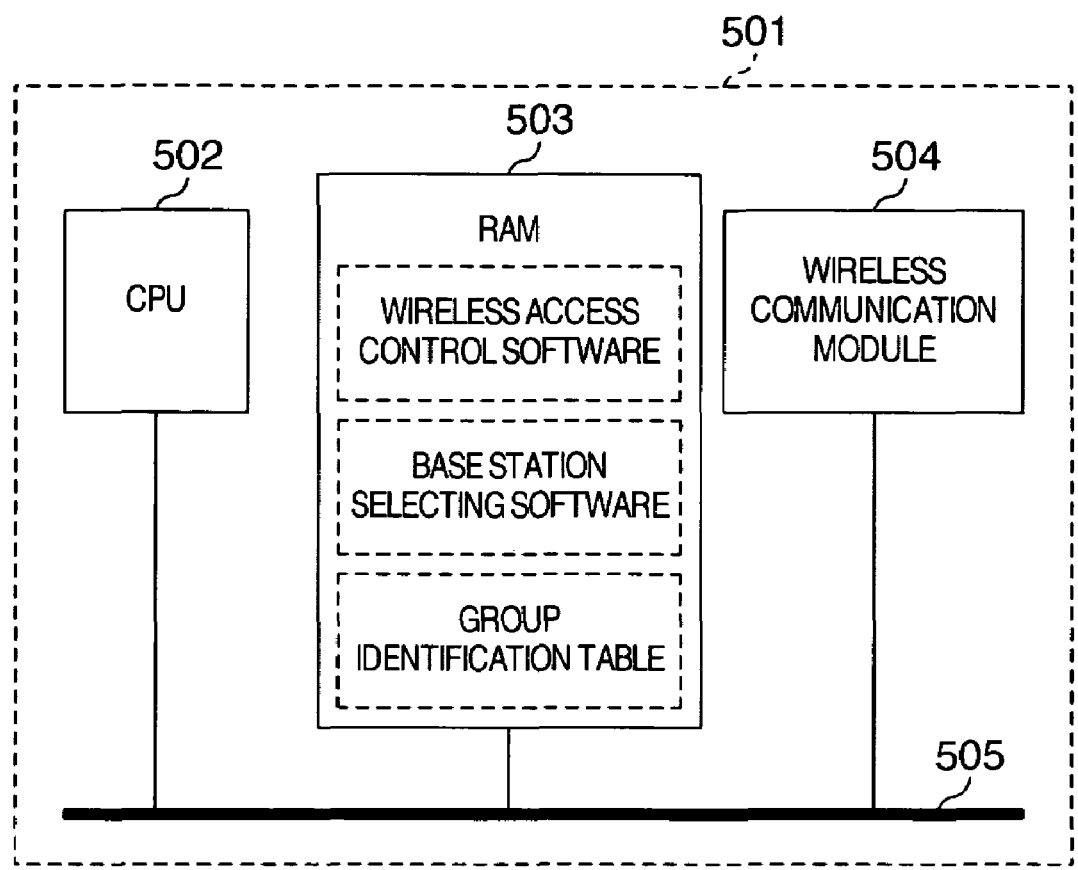
FIG. 5 is a diagram showing the functional block of a terminal in the embodiment in which the terminal side performs base station selection processing.

FIG. 5 is a functional block diagram of a terminal with the base station selection means described above. A terminal 501 comprises a CPU 502, a RAM 503, a wireless communication module 504, and a data bus 505 via which those components are connected. The terminal 501 includes, in the RAM 503, software for controlling the wireless communication module 504, software for executing the base station selection algorithm shown in FIG. 4, and the group identification table shown in FIG. 3A. The wireless communication function and the base station selection algorithm are implemented by executing the software, stored in the RAM, by the CPU. The wireless communication module 504 measures the received power of the signal from a base station, and the software calculates the group score. When the SNR (Signal-to-Noise Ratio) or the communication bit rate is used as the charactering quantities, the wireless communication module 504 also calculates the charactering quantities and the software calculates the group score. The base station selection method of the present invention can be executed in this configuration.

Figure 6:
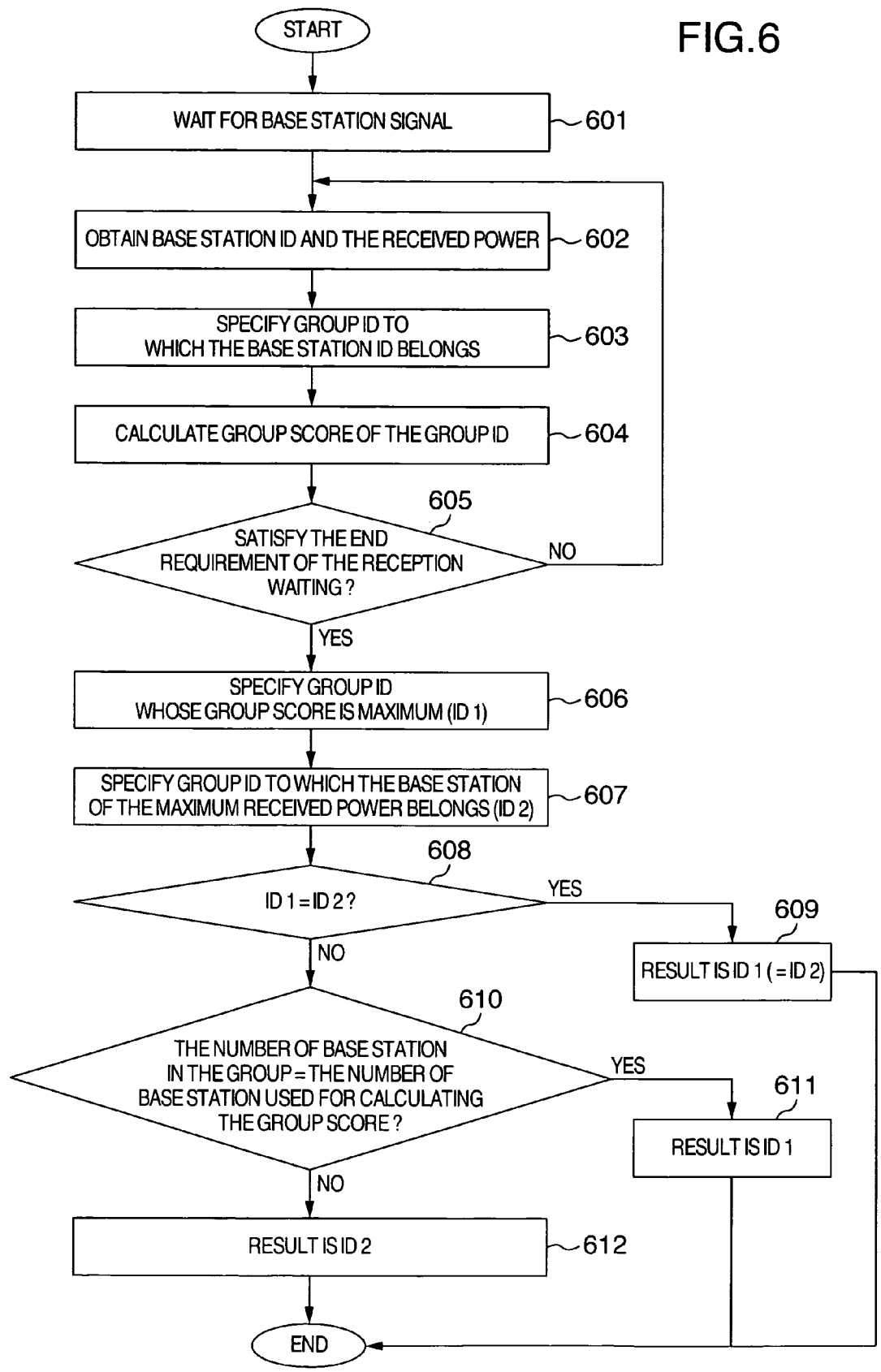
FIG. 6 is a processing flow showing the combination of the selection of a base station based on the maximum received power and the selection of a base station based on the group scores.

Next, an embodiment will be described with reference to FIG. 6 in which the selection of a base station based on the maximum received powers and the selection of a base station based on the group scores are combined. In step 601, the terminal starts waiting for a base station to send the signal. In response to the signal, the terminal obtains the base station ID and the received power from the signal in step 602. Next, in step 603, the terminal determines the group ID from the base station ID. Next, in step 604, the terminal uses the received power to calculate the group score of the corresponding group ID. After calculating the group score, the terminal checks in step 605 if the end requirement of reception waiting is satisfied. If the end requirement is not yet satisfied, the terminal returns control to step 602 and waits for another base station to send the signal. If the end requirement is satisfied, the terminal specifies the group ID, whose group score is the maximum, in step 606.

Next, in step 607, the terminal specifies the group ID to which the base station of the maximum received power belongs. Next, in step 608, the terminal compares the group ID specified in step 606 with the group ID specified in step 607. If both group IDs match, the terminal uses the matching group ID as the result of determination in step 609. If both group IDs do not match, the terminal compares, in step 610, the number of base stations in the specified group with the number of base stations used for calculating the group score. If both numbers of base stations match, the terminal uses the group ID, specified by the group score, as the result of determination in step 611. If both numbers of base stations do not match, the terminal uses the group ID, to which the base station of the maximum power belongs, as the result of determination in step 612. The determination flow described above reduces the probability of an error in determining the group of the base station, to which the terminal is to connect, even when the electric wave environment is too bad to obtain some of base station signals of the groups.

Figures 7, 8:
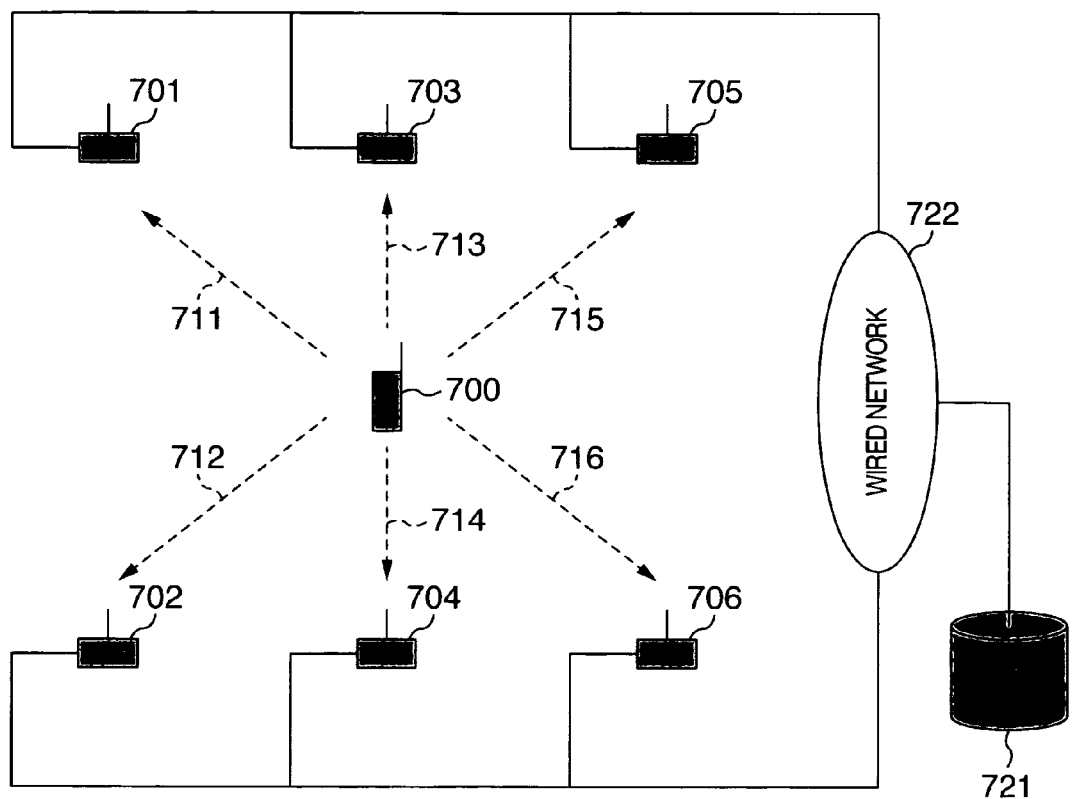
FIG. 7 is a diagram showing the general view of an embodiment in which the system side performs base station selection processing.
FIG. 8 is a diagram showing group identification table information entered into a server in the embodiment in which the system side performs base station selection processing.

Next, the following describes an embodiment in which a connection destination base station is selected by the system side. FIG. 7 is a diagram showing the general configuration where a base station is selected by the system side. The system comprises multiple base stations 701, 702, 703, 704, 705, and 706, a server 721 that selects a base station, and a wired network 722 via which the base stations and the server are connected. The wireless signal sent by a terminal 700 is received by the base stations 701-706 as received signals 711, 712, 713, 714, 715, and 716.

FIG. 8 is a diagram showing a group identification table 801 for classifying the signals, received by the base stations 701-706, into multiple groups. In this embodiment, this table is stored in the server. Note that this table need not stored always in the serve but may be stored in one base station. The table 801 includes information such as group IDs, group scores, base station (BS) IDs, and received powers. The server uses this table to associate groups with base station IDs. In the embodiment in which the system side selects a base station, the table shows that the base stations 701 and 702 belong to group G1, the base stations 703 and 704 belong to group G2, and the base stations 705 and 706 belong to group G3.

Figure 9:
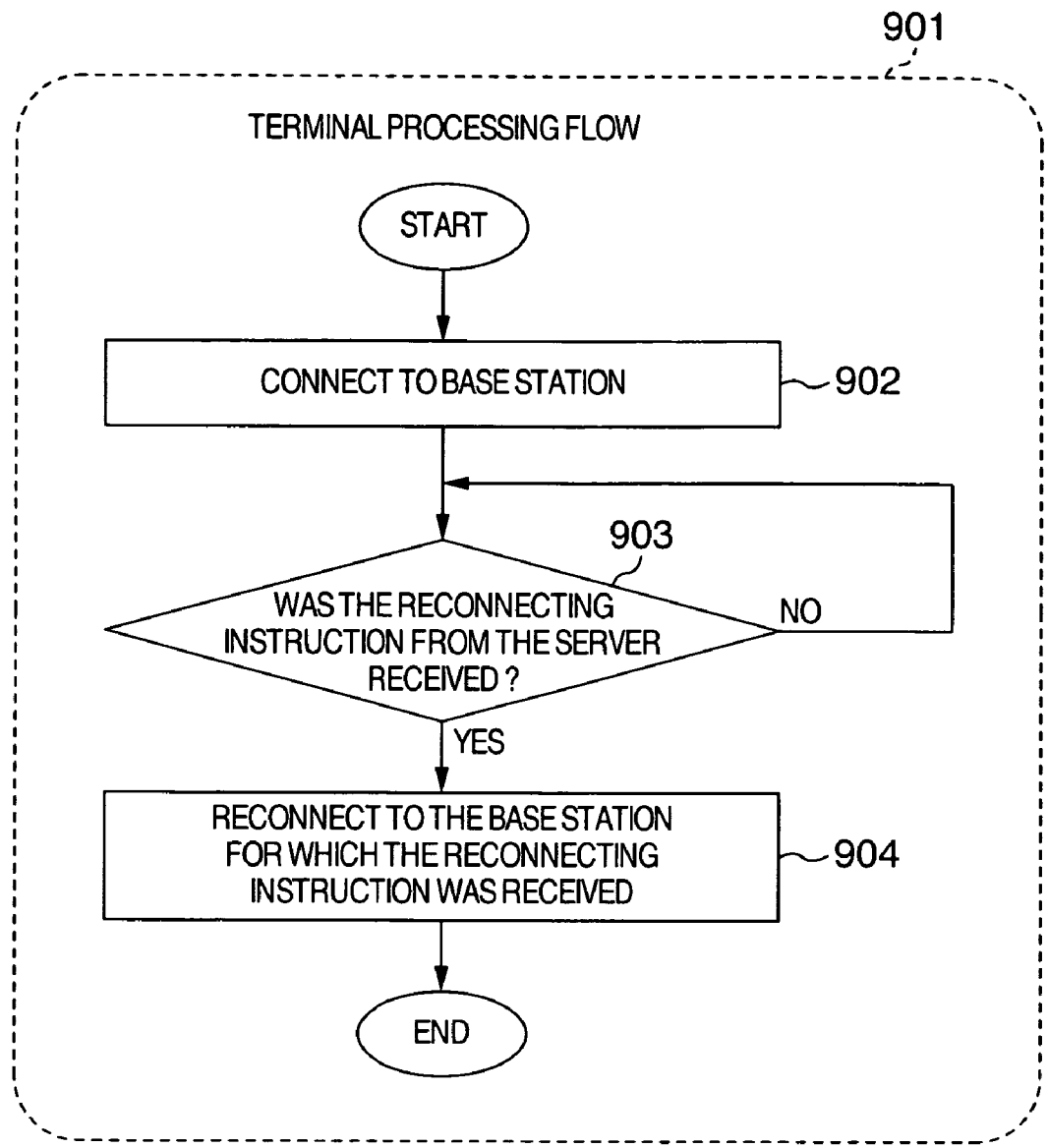
FIG. 9 is a processing flow of a terminal in the embodiment in which the system side performs base station selection processing.
Figure 10:
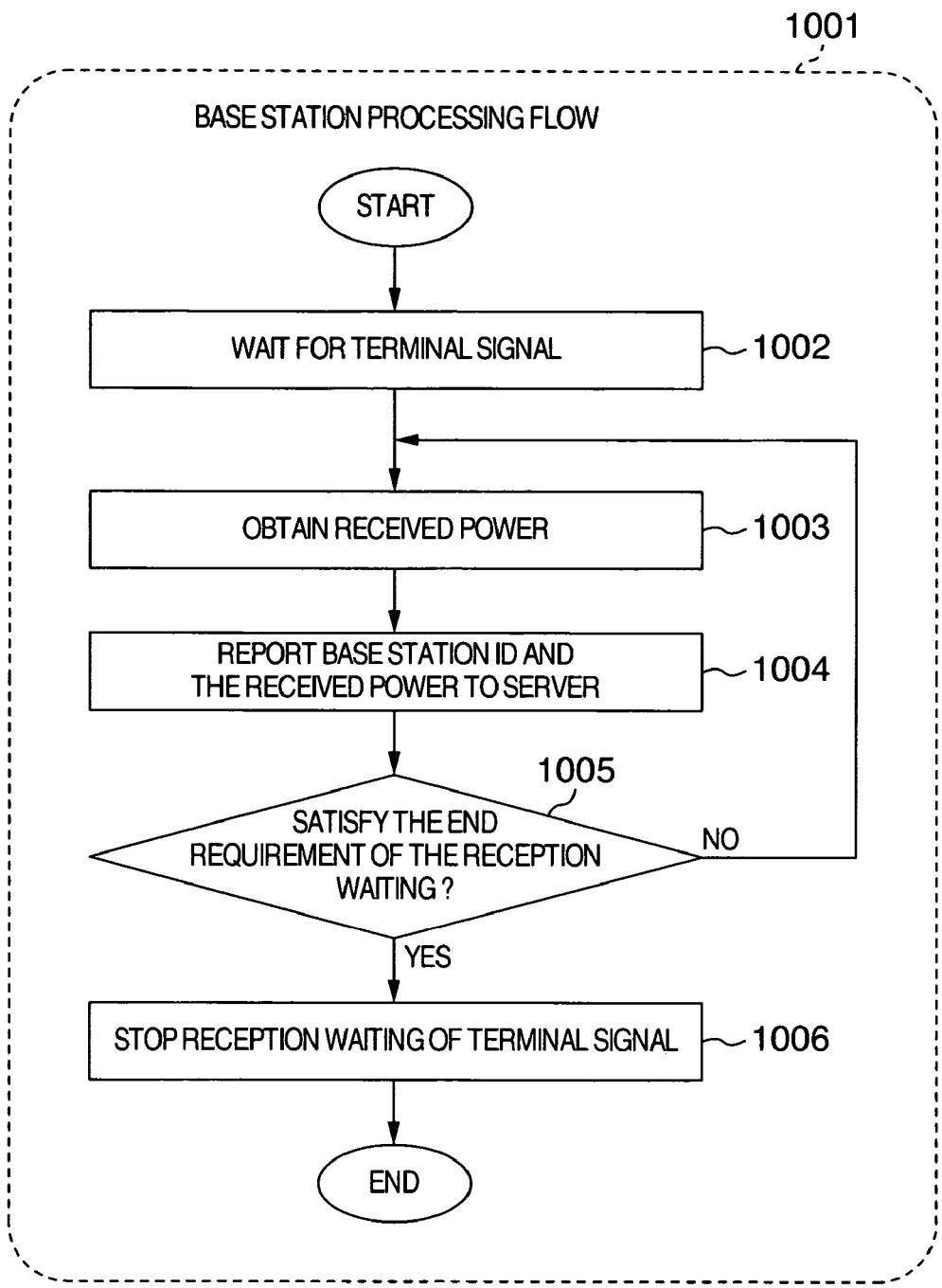
FIG. 10 is a processing flow of a base station in the embodiment in which the system side performs base station selection processing.
Figure 11:
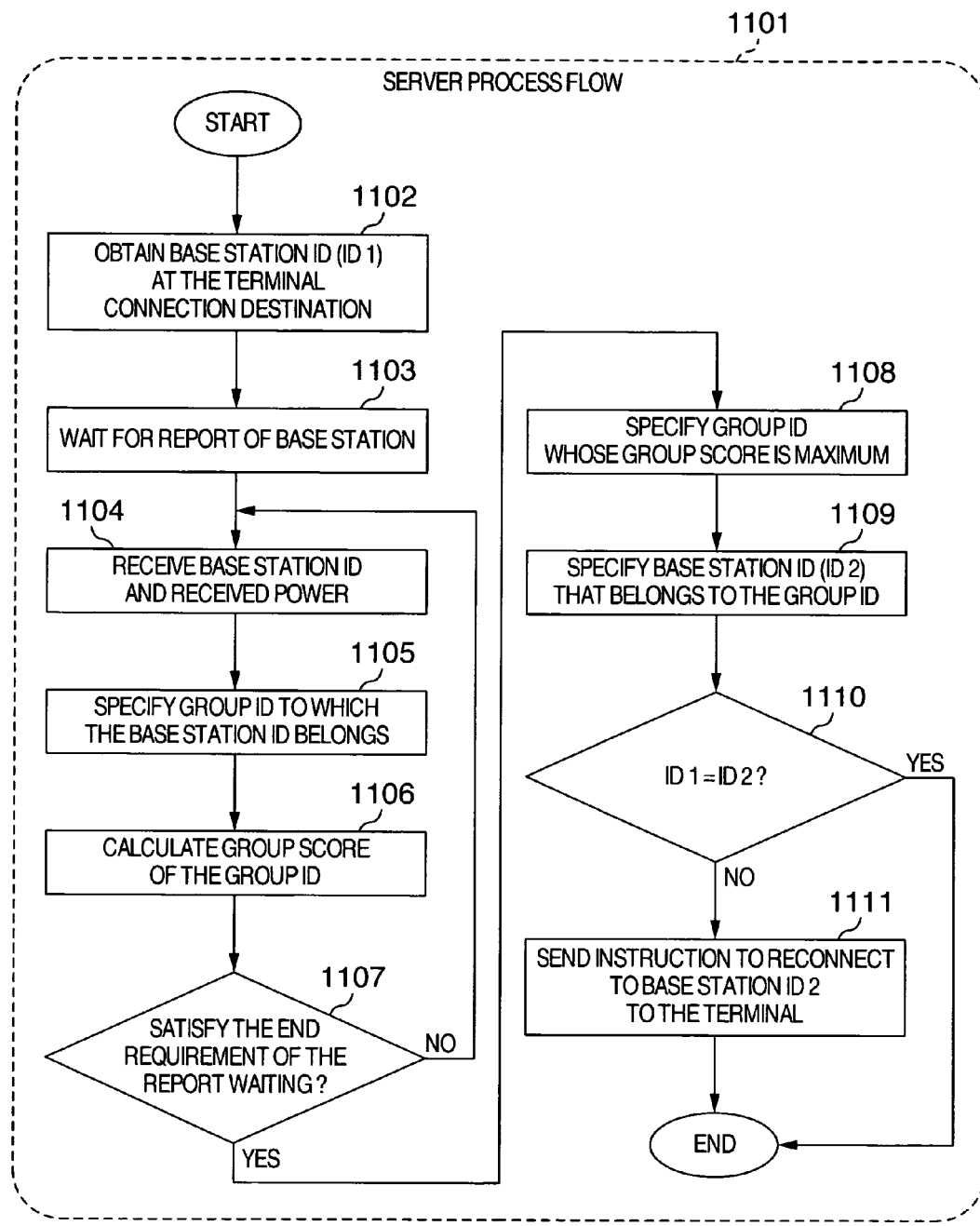
FIG. 11 is a processing flow of a server in the embodiment in which the system side performs base station selection processing.

Next, with reference to FIGS. 9, 10, and 11, the following describes a procedure executed when the system side determines a terminal connection destination. FIG. 9 shows the terminal processing flow, FIG. 10 shows the base station processing flow, and FIG. 11 shows the server processing flow. In step 902 in the terminal processing flow 901, the terminal once connects to a base station. At this time, the base station reports to the server that the terminal has been connected. Upon receiving this report, the server obtains the base station ID of the base station, to which the terminal is currently connected, in step 1102 in the server processing flow 1101.

Each base station receives the signal, which is sent and received when the terminal connects to the base station, in step 1002 of the base station flow 1001 and, in step 1003, obtains the received power of the terminal signal at each base station. In step 1004, the base station sends its own base station ID and the received power to the server. If the end requirement of the reception waiting is satisfied in step 1005, the base station stops waiting for the terminal signal in step 1006; if the end requirement is not satisfied, the base station continues waiting for the terminal signal.

In step 1103 of the server processing flow 1101, the server starts waiting for a base station to send the report of the terminal signal. Upon receiving the report from a base station in step 1104, the server checks the base station ID to determine the group ID to which the base station belongs in step 1105. Then, the server calculates the group score in step 1106. If the end requirement of report waiting is not satisfied in step 1107, the server waits for another base station to send the report. If the end requirement is satisfied, the server specifies the group ID whose group score is the maximum in step 1108. In step 1109, the server determines one of the base stations in the specified group as the connection destination base station. Next, in step 1110, the server compares the base station ID which was reported in step 1102 and to which the terminal is currently connected with the base station ID determined in step 1109. If they match, the server maintains the current state. If they do not match, the server sends a reconnection instruction to the terminal via the base station in step 1111, wherein the reconnection instruction specifies the base station ID, determined in step 1109, as the base station ID of the reconnection destination. In response to the reconnection instruction received in step 903 of the terminal processing flow, the terminal reconnects in step 904 to the base station whose base station ID is specified by the reconnection instruction. The processing flow executed by the system side for selecting a base station is as described above.

Figure 12:
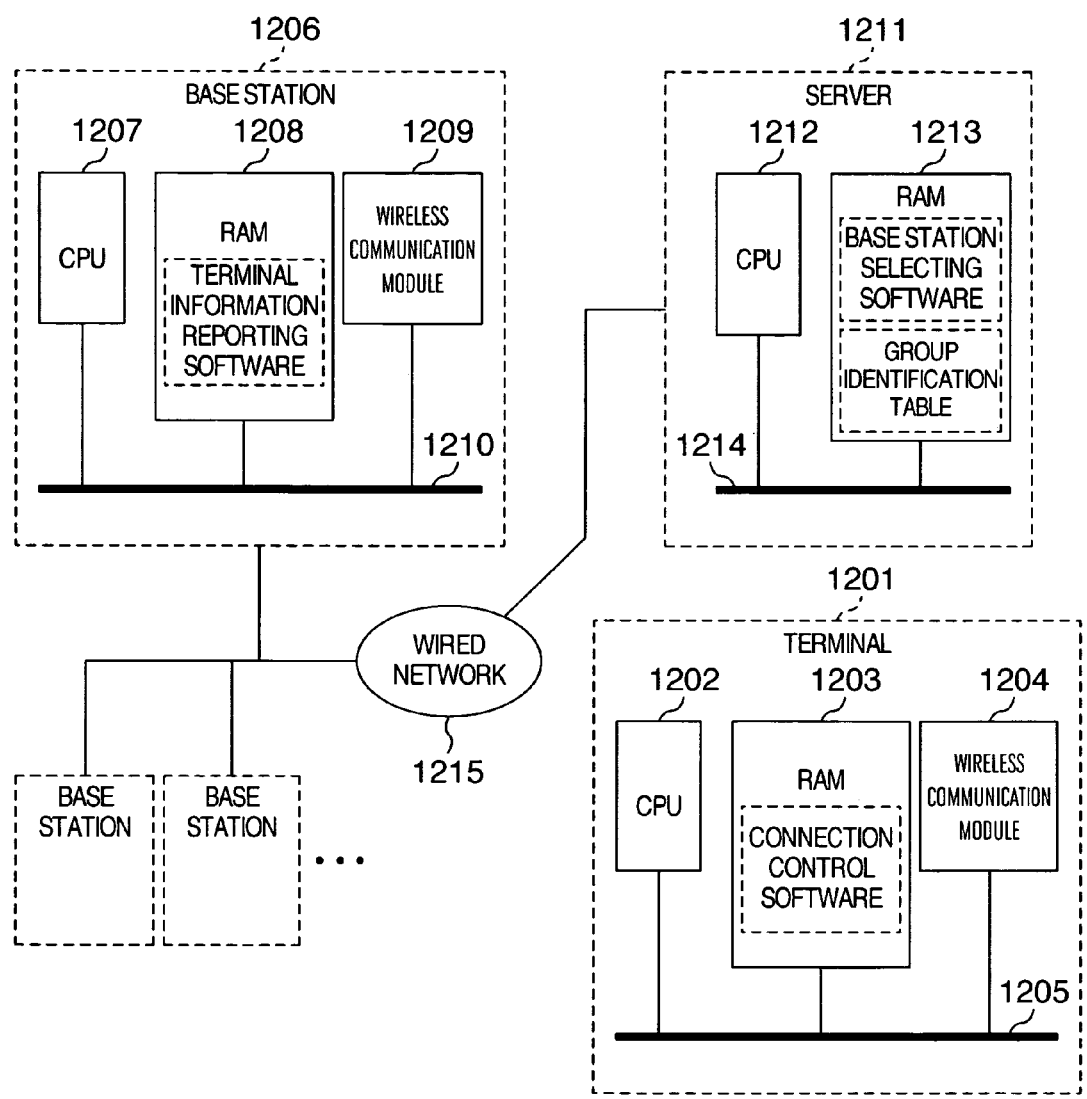
FIG. 12 is a diagram showing the functional blocks of the terminal, base station, and server in the embodiment in which the system side performs base station selection processing.

FIG. 12 shows the functional blocks of a terminal, a base station, and a server when the method of the present invention is executed on the system side. The functional block 1201 of a terminal comprises a CPU 1202, a RAM 1203, a wireless communication module 1204, and a data bus 1205 via which those components are connected. Software for controlling connection destination selection is stored in the RAM 1203. The functional block 1206 of a base station comprises a CPU 1207, a RAM 1208, a wireless communication module 1209, and a data bus 1210 via which those components are connected. Software for reporting information on the terminal wireless signal is stored in the RAM 1208. The wireless communication module 1209 measures the received power, the SNR, and the communication bit rate of the signal from the terminal. The functional block 1211 of a server comprises a CPU 1212, a RAM 1213, and a data bus 1214 via which those components are connected. Software for selecting a connection destination base station and the group identification table shown in FIG. 8 are stored in the RAM 1213. The base station 1206 and the server 1211 are connected via a wired network 1215 for sending and receiving base station wireless signal information.

Next, the following describes an embodiment in which a wireless terminal switches the connection destination from one base station to another while the wireless terminal moves. The embodiment will be described by referring to an example in an IP phone system shown in FIG. 13. Assume that a vertical-direction corridor and a horizontal-direction corridor intersect, that base stations 1301, 1302, and 1303, are installed in the vertical-direction corridor, and that those three base stations belong to group G1. Also assume that base stations 1304, 1305, and 1306 are installed in the horizontal-direction corridor and that those three base stations belong to group G2. When the terminal moves from point A to point C, the system performs the following processing. In the conventional method in which the terminal switches the base station, whose power is the maximum, from one base station to another, the terminal switches the base station sequentially from base station 1301 to base station 1302 and so on while it moves. In this case, the communication is interrupted for a moment when the base station is switched and, therefore, the voice chat is interrupted. In addition, depending upon the terminal setting, the base station is not switched unless the reception sensitivity of the current base station becomes very low. In this case, the base station is not switched to the next base station before the terminal moves near point B and, in the neighborhood of point B, the quality of the voice chat communication is poor. To solve this problem the present invention can be applied to the terminal side as follows.

Figure 13:
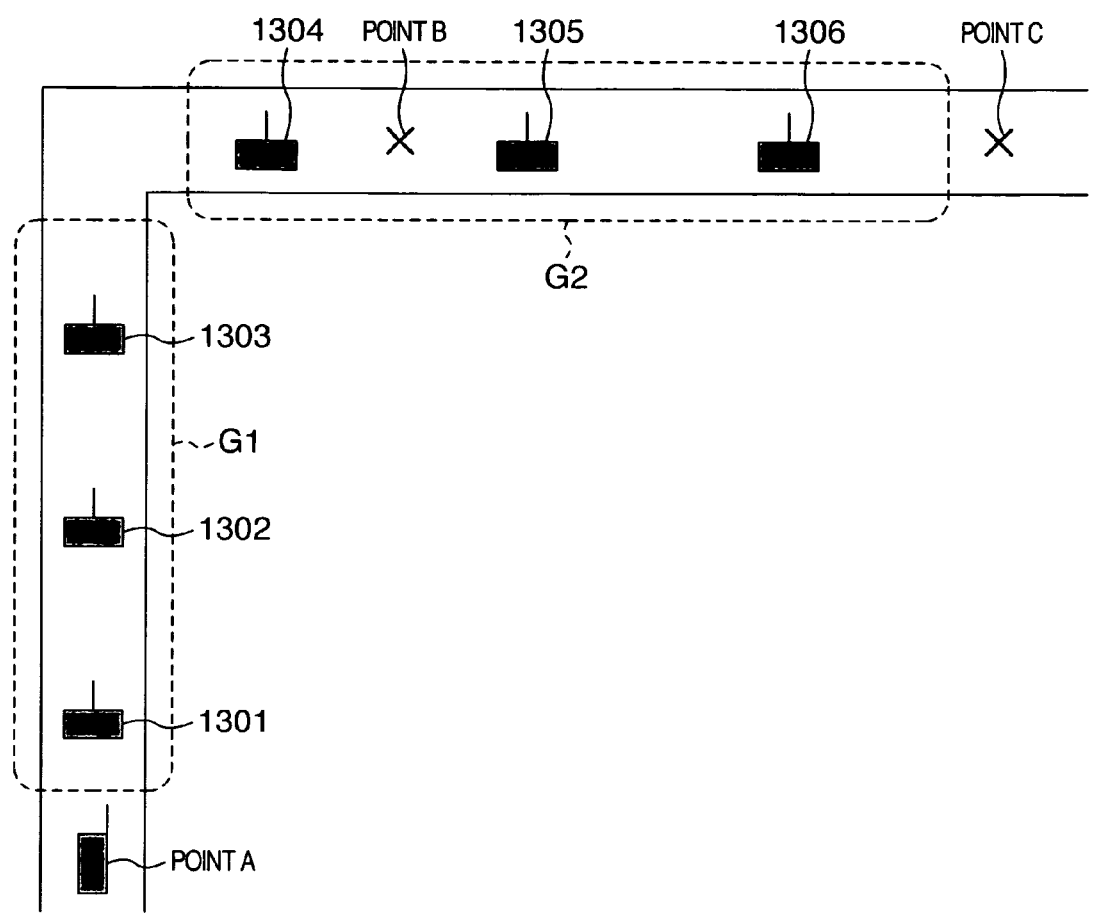
FIG. 13 is a diagram showing the general configuration of an embodiment in which the present invention is applied to an IP phone system.

FIG. 14 shows a group identification table in which the information on the base stations in FIG. 13 is stored. The terminal references the information in the table 1400 and remains connected to one of the base stations of group G1 while it is in the vertical-direction corridor. When the terminal moves to the horizontal-direction corridor, the terminal quickly reconnects to group G2. The method according to the present invention reduces the number of times the base stations are switched and maintains the communication quality, thus allowing a voice chat and so on to be maintained without degrading the communication quality.

Figure 15:
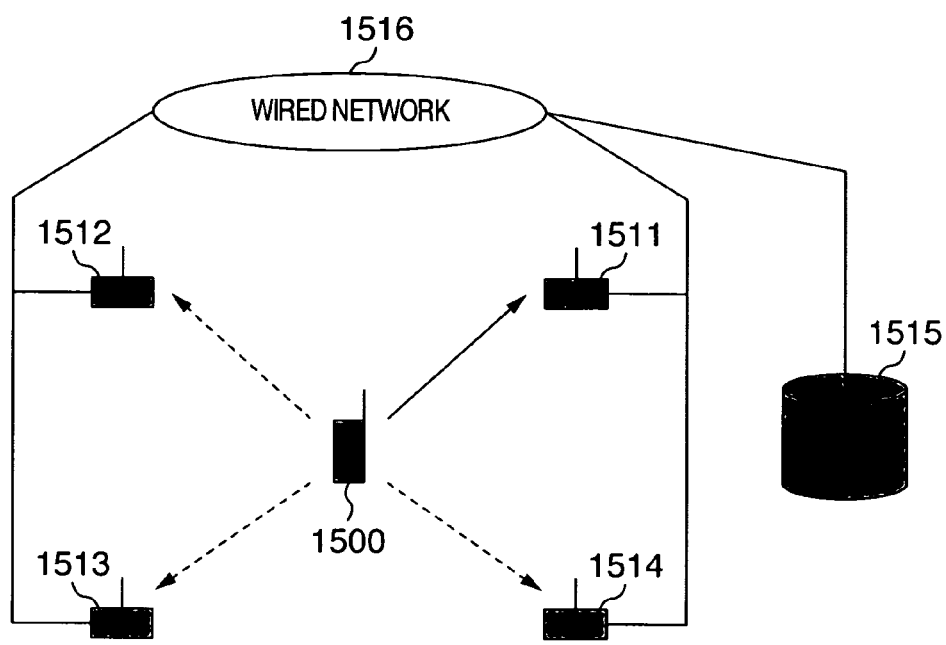
FIG. 15 is a diagram showing the general view of a wireless-LAN-based position detection system.

Next, the following describes an embodiment in which the present invention is applied to a wireless-LAN-based position detection system. FIG. 15 shows the configuration of a wireless-LAN-based position detection system disclosed in JP-A-2004-101254. The system comprises a terminal 1500, a base station 1511 that is in communication with the terminal, three or more base stations 1512, 1513, and 1514 each with a function to measure the signal reception time, a server 1515 that carries out position detection calculation, and a wired network 1516 via which the terminal, base stations, and server are connected. This position detection system uses the difference in the propagation time of a signal transferred between the terminal and the multiple base stations to identify the position of the terminal. The signal used here is sent from the base station (source), to which the terminal is connected, to the terminal (destination).

Figure 16:
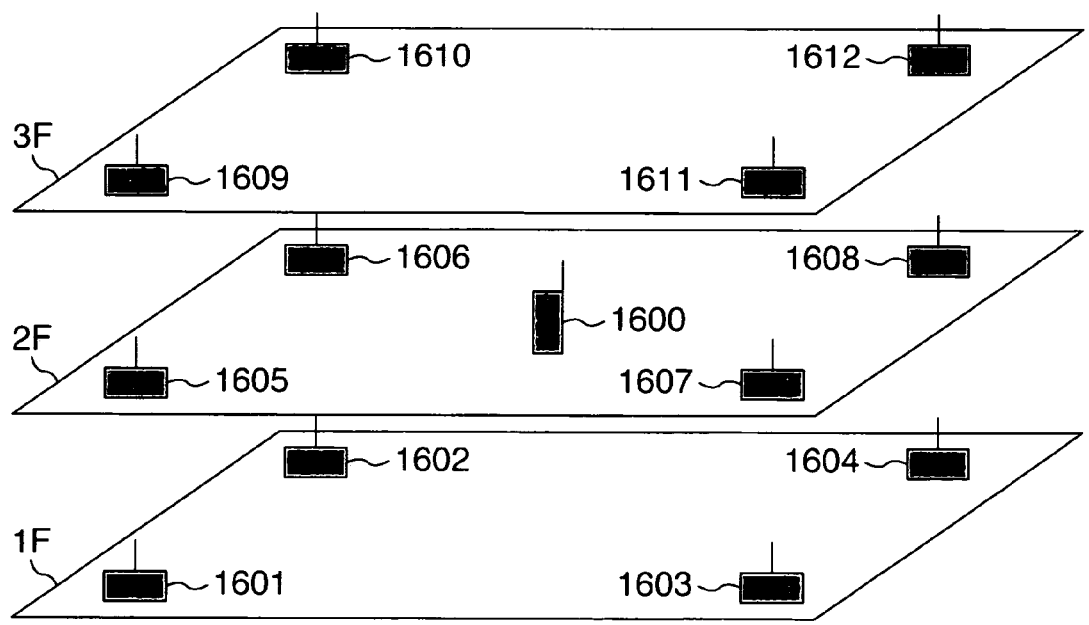
FIG. 16 is a diagram showing the general view of an embodiment in which the present invention is applied to the wireless-LAN-based position detection system.

The following describes an embodiment of the present invention in which this system is installed in a building of a multiple-layer floor structure shown in FIG. 16. Base stations 1601, 1602, 1603, and 1604 are installed on the first floor of the building, base stations 1605, 1606, 1607, and 1608 on the second floor, and base stations 1609, 1610, 1611, and 1612 on the third floor. When a terminal 1600 performs position detection on any of the first floor, second floor, and third floor in the building, the terminal should connect to any of the base stations on the floor on which the terminal is. If the terminal connects to a base station on a floor different from that on which the terminal is, the position detection system cannot detect the position correctly for the reason described below. When the terminal connects to a base station on a floor, the wireless-LAN-based position detection system shown in FIG. 16 uses the base stations on that floor to detect the position of the terminal. For example, when the terminal 1600 connects to the base station 1605 on the second floor, the system carries out the position detection calculation using wireless signal propagation time differences measured by three base stations 1606, 1607, and 1608. At this time, if the terminal 1600 is on the first floor but connects to the base station 1605 on the second floor, the position detection signal sent by the terminal 1600 reaches the base stations 1606, 1607, and 1608 by the transmission through the floor between the first floor and the second floor or via an external bypass. In this case, the base stations 1606, 1607, and 1608 cannot measure the wireless propagation time difference correctly and, as a result, cannot detect the position correctly. In the conventional method in which the terminal connects to a base station whose power is the maximum, the problem is that the terminal cannot always connect to a base station on the floor on which the terminal is, because the electric wave passes through the entrance or an electric wave reflected by a nearby building is received. The following describes an embodiment in which the present invention is applied to solve this problem.

FIG. 17 is a group identification table in which the installation state in FIG. 16 is stored. The base stations are classified into groups by floor and the classified result is entered into the terminal. Using the table 1700 to determine the connection destination, the terminal is more likely to connect to a base station on the floor on which the terminal is. In the conventional method in which a base station whose power is the maximum is selected, the problem is that there is an area where the terminal sometimes connects to a base station on a different floor. In contrast, in this embodiment, the terminal is more likely to connect to a base station on the floor on which the terminal is and, as a result, the position can be detected correctly.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A connection control method for selecting one base station, to which a terminal is to connect, from a plurality of base stations in a wireless communication system, said connection control method comprising:
    a first step of obtaining an index of communication quality between the terminal and the base stations for each of said plurality of base stations wherein, said plurality of base stations being classified into a plurality of groups;
    a second step of calculating characterizing quantities of the communication quality for each of the groups; and
    a third step of specifying one of the plurality of groups based on the charactering quantities and selecting one of base stations, which belong to the specified group, as a connection destination base station of said terminal.

2. The connection control method according to claim 1 wherein, in said second step, said terminal receives wireless signals from said base stations, measures received powers, adds up the received powers for each of the groups, and determines a result of the addition as the charactering quantities of the communication quality and
    in said third step, said terminal specifies a group whose charactering quantities are a maximum or larger than a threshold and selects a base station, which belongs to the specified group, as the connection destination base station of said terminal.

3. The connection control method according to claim 1 wherein, when said terminal receives wireless signals from said base stations, said terminal obtains received powers, calculates an average of the received powers for each of said plurality of groups using a number of base stations, determines the average as the charactering quantities of the communication quality, specifies a group whose charactering quantities are a maximum or larger than a threshold, and selects a base station, which belongs to the specified group, as the connection destination base station of said terminal.

4. The connection control method according to claim 1 wherein, in said second step, said terminal receives wireless signals from said base stations, obtains bit rates at which data can be sent, adds up the bit rates for each of the groups, and determines a result of the addition as the charactering quantities of the communication quality and
    in said third step, said terminal specifies a group whose charactering quantities are a maximum or larger than a threshold and selects a base station, which belongs to the specified group, as the connection destination base station of said terminal.

5. The connection control method according to claim 1 wherein, in said second step, said terminal receives wireless signals from said base stations, obtains SNR (Signal-to-Noise Ratio) values of the received signals, adds up the SNR values for each of said plurality of groups, and determines a result of the addition as the charactering quantities of the communication quality and
    in said third step, said terminal specifies a group whose charactering quantities are a maximum or larger than a threshold and selects a base station, which belongs to the specified group, as the connection destination base station of said terminal.

6. The connection control method according to claim 1 wherein a base station, to which said terminal is to connect, is determined for each group in advance and the determined base station is selected from the base stations, which belong to the specified group, as the connection destination base station of said terminal.

7. The connection control method according to claim 1 wherein a base station, from which a strongest received power is obtained, is selected from the base stations, which belong to the specified group, as the connection destination base station of said terminal.

8. The connection control method according to claim 1 wherein a base station, from which a highest communication bit rate is obtained, is selected from the base stations, which belong to the specified group, as the connection destination base station of said terminal.

9. The connection control method according to claim 1 wherein a base station, from which a highest SNR value is obtained, is selected from the base stations, which belong to the specified group, as the connection destination base station of said terminal.

10. A terminal positioning method for detecting the position of a terminal using times at which a signal, which is sent and received between a base station and said terminal, are received by a plurality of base stations, said base station being selected and connected by the method according to claim 1.

11. A wireless terminal for selecting a connection destination base station from a plurality of base stations in a wireless communication system, comprising:
   a storage unit in which group information generated by classifying the plurality of base stations into groups; and
   a control unit that obtains an index of communication quality between the wireless terminal and the base stations for each of said plurality of base stations, calculates-characterizing quantities of the communication quality for each of the stored groups, specifies one of the plurality of groups based on the charactering quantities, and selects one of base stations, which belong to the specified group, as the connection destination base station.

12. The wireless terminal according to claim 11, further comprising a wireless communication module for measuring a received power or an SNR value, sent from each of the base stations, as the characterizing quantities.

13. The wireless terminal according to claim 11
   wherein said control unit detects a bit rate between said wireless terminal and each of the base stations as the characterizing quantities.

14. The wireless terminal according to claim 11,
   wherein said wireless terminal sends and receives a wireless signal, which is used for detecting a position using propagation time differences of the signal, to and from the connection destination base station.

15. A wireless communication system in which a terminal has means for selecting one base station from a plurality of base stations with which the terminal is to wirelessly communicate, said wireless communication system comprising:
   a plurality of wireless base stations classified into a plurality of groups; and
   a wireless terminal to be connected to one of said plurality of wireless base stations,
   wherein an index of communication quality between said wireless terminal and the wireless base stations is obtained for each of said base stations, characterizing quantities of the communication quality are calculated for each of the groups, one of the plurality of groups is specified based on the characterizing quantities, and one of the wireless base stations of the specified group is selected as a connection destination base station of the wireless terminal.

16. The wireless communication system according to claim 15
   wherein the position of said wireless terminal is calculated using times at which a wireless signal, which is sent and received between said connection destination base station and said wireless terminal, is received by other wireless terminals.

* * * * *